Aug. 25, 1931.    G. W. CHRISTIANS    1,820,347
APPARATUS FOR SEALING CREVICES IN ROCK FORMATIONS OR THE LIKE
Original Filed Aug. 7, 1926
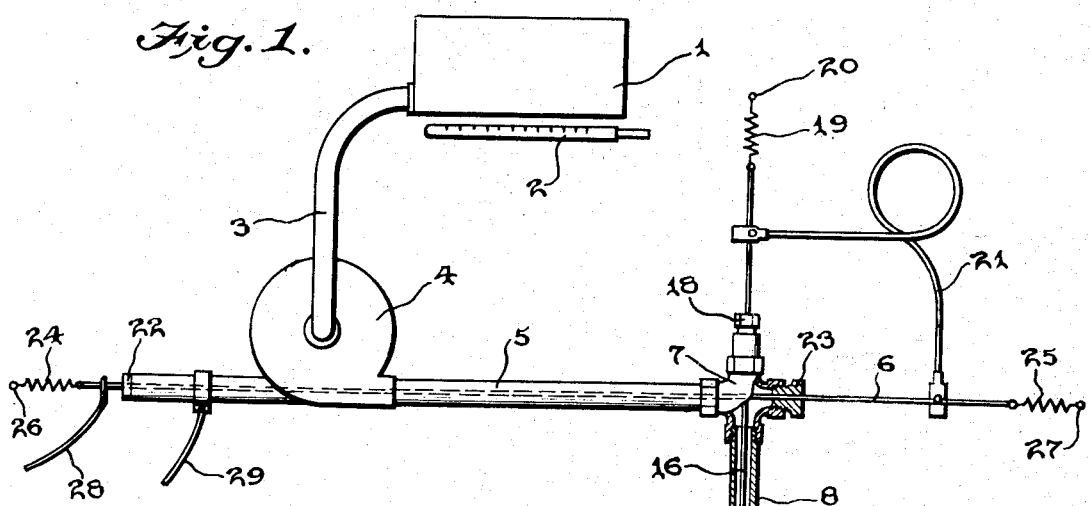
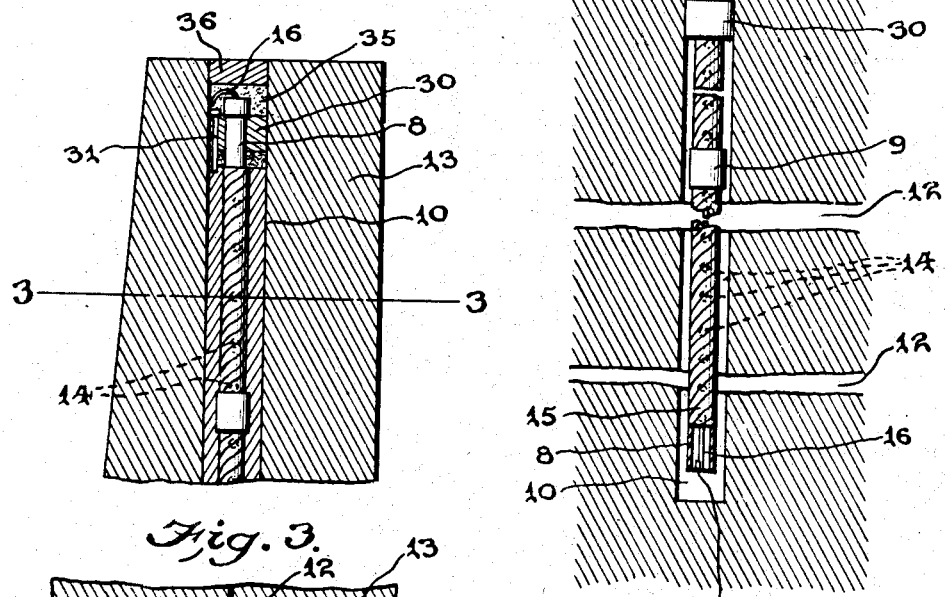
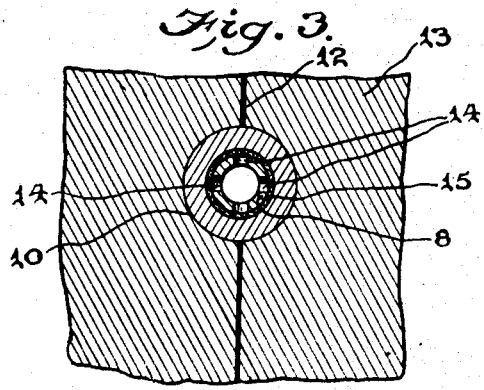
Inventor
G. W. Christians
By Robt. E. Barry
Attorney Patented Aug. 25, 1931

1,820,347

UNITED STATES PATENT OFFICE

GEORGE W. CHRISTIANS, OF CHATTANOOGA, TENNESSEE

APPARATUS FOR SEALING CREVICES IN ROCK FORMATIONS OR THE LIKE

Original application filed August 7, 1926, Serial No. 127,896. Divided and this application filed March 30, 1928. Serial No. 265,962.

This invention relates to a method and apparatus for sealing crevices, spaces or recesses in rock, stone or masonry formations, and the present application is a division of my application Serial No. 127,896, filed Aug. 7, 1926.

In my said pending application, I have disclosed a crevice sealing system in which thermoplastic material, such as asphalt or the like, is pumped through a heated pipe line which leads the sealing material to the fissure or crevice to be sealed, and this pipe line is perforated and provided with a jacket of canvas or the like, which permits the pipe to be filled with the thermoplastic material before the canvas punctures and allows the material to flow into the fissure or crevice.

As explained in my parent application, my system may be employed for many purposes, and one of these is the sealing of expansion joints in concrete walls or the like. The present invention is partly directed to this feature of the system.

The invention of the present application also relates to a method and means for finishing a sealing operation, and one of the objects of the invention is to provide a system in which a perforated pipe is placed in a passageway which communicates with the crevice, crack or fissure to be sealed with thermoplastic material. The perforations in the pipe are initially closed by some suitable puncturable material, such as canvas, and in sealing the joint, crack or the like, the material which is forced through this pipe while maintained in heated condition, will puncture the canvas, enter the passageway, seal the crevice; and may eventually fill the passageway. When the sealing operation is finished, the portion of the pipe line above the ground or wall surface, may be disconnected, and the heating wire cut, and the portion of the pipe and wire within the hole may remain therein for future operations. Then the upper end of the pipe and wire will be covered or embedded in a cap of thermoplastic material, such as asphalt, and finally, a plug of concrete or the like may be placed over the asphalt cap to complete the job.

With a system of this character, additional sealing material may be forced into the passageway and crevice at some future date. When it is desired to do this, at some later time, the concrete plug may be removed, and then the cap slug of asphalt may be melted, and after this, the outside portion of the pipe line which communicates with the pump, may be attached to the portion of the pipe line that remains within the hole In making this connection, the severed wire will be spliced, and the apparatus will then be ready to heat the material within the pipe line, so that additional thermoplastic material may be forced through the pipe, and into the crack or crevice.

The invention is illustrated in the accompanying drawings, in which,

Fig. 1 is a side view partly in section, of one form of my apparatus, and a section of fissured rock or stone, into which heated thermoplastic material is pumped.

Fig. 2 is a vertical sectional view of a portion of the apparatus, shown arranged in a concrete wall or the like. The apparatus in this instance having been used to seal a joint or the like in the wall with thermoplastic material.

Fig. 3 is a horizontal sectional view taken on line 3—3 of Fig. 2.

Referring to the drawings, 1 designates a tank to contain thermoplastic material. This tank may be heated by any suitable means such as a burner 2. A pipe line 3 leads the material after it has been rendered fluid by heating, into a pump 4 which forces the material into a pipe 5. This pipe is heated directly by a wire 6 which passes through the same.

A cross-shaped fitting 7 is connected to one end of the pipe, and another pipe 8 has its upper end connected to this fitting. The pipe 8 is made in sections, connected by suitable couplings 9, and it is adapted to be placed in a hole 10 that is drilled or bored in the body 11 which contains the recess, fissure or crevice 12 that is to be sealed.

In Fig. 1, the crevice occurs within the earth, while in Figs. 2 and 3, the crevice is formed by a crack or expansion joint in a concrete wall 13 or the like.

The portion of the pipe 8 that is located in the hole, is provided with perforations 14, and for the purpose of preventing stones, dirt or the like from entering these perforations while the pipe is being installed, a jacket 15 of canvas or other puncturable material is wrapped around the perforated portion of the pipe.

A heating wire 16 also extends through the pipe 8, and has its lower end connected to the lower end of the pipe, as shown at 17. The upper end of the wire passes loosely through an insulation plug 18 on the fitting 7, and is secured to a coiled spring 19. The upper end of the spring is fixed at the point 20 to some stationary object, and consequently, the spring keeps the wire taut in the pipe, and prevents the latter from contacting with the pipe, except at the point 17. An electric conductor 21 connects the wire 16 to the wire 6, and the latter wire passes loosely through plugs of insulation at the points 22 and 23, and is secured to springs 24 and 25 that are connected to stationary points 26 and 27, so that the wire 6 is also kept taut.

Line or supply wires 28 and 29 are connected respectively to the wire 6 and pipe 5, and due to this construction, electric current may pass from the line wire 28 through 6, 21, 16, 17, 8, 7, 5 and 29, back to the source of supply, and in this way the wires 6 and 16 will be heated to maintain the pipes in heated condition while the fluid theremoplastic material is traveling therethrough.

After the parts have been properly assembled, and the pipe 8 has been placed in the hole, a plug or stopper 30 may be arranged on the pipe 8 near the upper end of the hole, and this plug has a port 31 through which air, water or the like may escape while the crevice is being sealed. The port is shown in Fig. 2.

In my system, the material, such as asphalt, heated in the tank 1, is forced by the pump 4, through the pipes 5 and 8, and into the hole, and as it is heated while traveling through the pipes, it will fill the latter and then exit into the hole and travel into the crevice. When the pressure is increased on the material, the canvas jacket on the pipe will puncture and the material will exit through the perforations in the pipe, and then, as additional material is forced into the hole, such material will find its way into the crevices and effectively seal the latter.

When the job is complete, more or less of the asphalt will occupy the hole, and then the upper portion of the pipe 8 may be disconnected from the portion of the same which is to remain within the hole (see Fig. 2), and the wire 16 can be severed near the top of the hole. After this, some of the asphalt, while in fluid condition, may be poured into the upper end of the hole, to form a removable protective cap 35, and finally this cap may be covered over by any suitable means such as concrete, to form a plug 36.

Should it be found necessary at any future date, to renew the seal, this may be readily accomplished by simply removing the plug 36, and then softening the slug 35 by heat. Now, the exterior portion of the apparatus may be again attached to the portion of the same which remains in the hole, by simply coupling up the pipe sections and splicing the wire 16. Then, as current is again supplied by the line wires 28 and 29, the asphalt within the pipe 8 will be placed in fluid condition, and as increased pressure is applied, this heated asphalt will exit through the perforations in the pipe, and heat the asphalt in the hole, and as pressure is applied, the fluid asphalt will find its way into the recess or crack to be sealed.

In this way, the crevice may be periodically sealed, if this is found necessary, but I have determined, from experience, that a single sealing is sufficient in most instances. In the expansion joints of walls or the like, subsequent sealings may be required, due to the expansion and contraction of the wall sections.

From the foregoing, it is believed that the invention may be clearly understood, and I am aware that numerous changes may be made in the details disclosed, without departing from the spirit of the invention as expressed in the claims.

What I claim and desire to secure by Letters Patent is:

1. In combination, a passageway arranged in stone or similar formations, a conduit arranged within the passageway, a ported plug surrounding the upper portion of the conduit, a thermoplastic cap resting on the plug and within which the upper end of the conduit is embedded, and a plug of masonry material closing the upper end of the passageway.

2. In combination, a passageway arranged in stone or similar formations, a conduit arranged within the passageway and having perforations in its wall, a heating wire connected at its lower end to the conduit and having its other end projecting through the upper end of the conduit, a ported plug arranged in the passageway and surrounding the upper end portion of the conduit, a thermoplastic cap arranged in the passageway over the plug and within which the upper end of the wire and the upper end of the conduit are embedded, and a removable plug completely closing the upper end of the passageway.

GEORGE W. CHRISTIANS.